Dec. 9, 1958 — P. SCHAIN — 2,863,734
METHOD AND REAGENTS FOR FAT DETERMINATION
Filed Oct. 16, 1950
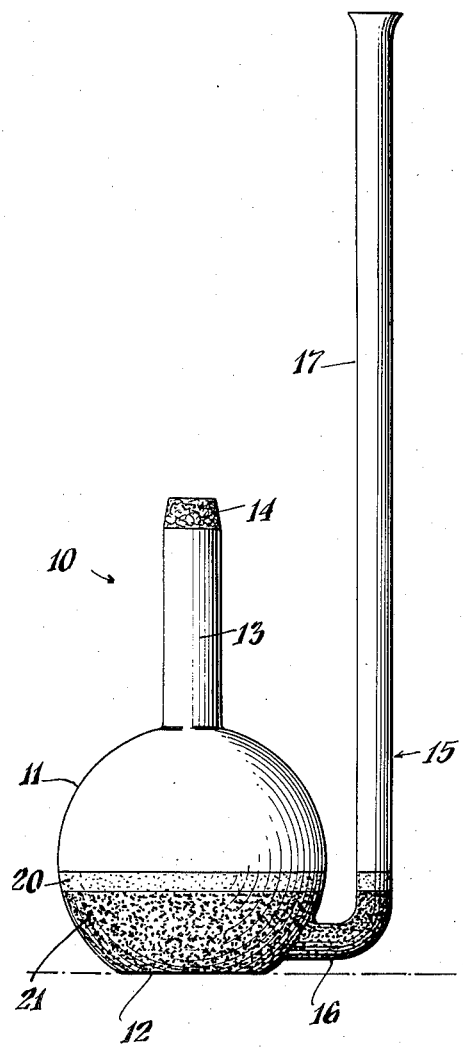
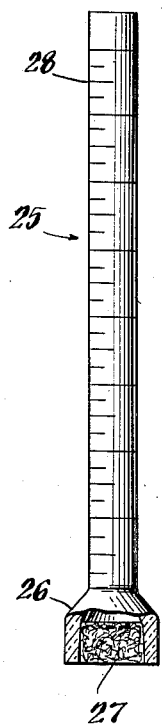
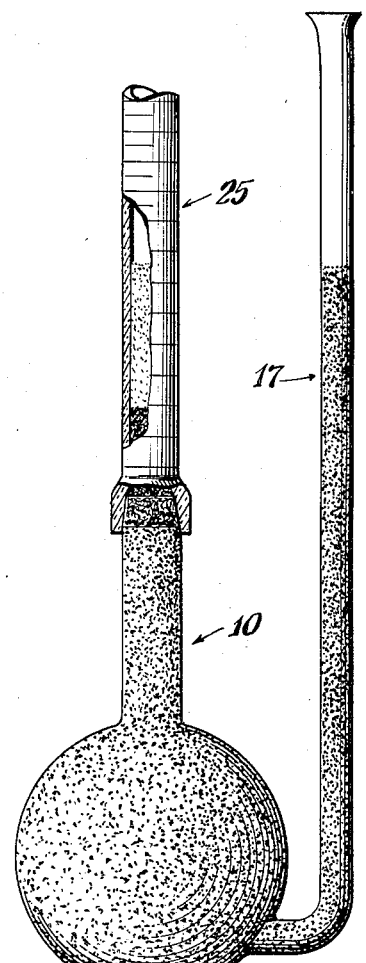
INVENTOR.
Philip Schain
BY Dicke & Padlon
ATTORNEYS United States Patent Office 2,863,734
Patented Dec. 9, 1958

2,863,734

METHOD AND REAGENTS FOR FAT DETERMINATION

Philip Schain, New York, N. Y.

Application October 16, 1950, Serial No. 190,437

20 Claims. (Cl. 23—231)

This invention relates to a method and reagent for separating fat, particularly for the purpose of fat determination in organic substances such as food products, organic tissues and the like, and more particularly to a method for the determination of fat in milk and dairy products. This application is a continuation-in-part of my copending application for "Method of Determining the Fatty Content in Foods and Similar Substances," Serial No. 64,854, filed December 11, 1948, and now abandoned.

Heretofore in the routine determination of fat in milk, cream, ice cream and the like the Babcock test has been in general use. For more precise results an extraction method such as the Roese-Gottlieb method or one of its modifications is used. Both types of test have serious drawbacks. The Babcock test requires the use of a hazardous chemical—concentrated sulfuric acid—and involves a hazardous operation—mixing the concentrated acid with milk. It also requires a centrifuge and involves three centrifugating steps. The extraction methods involve manipulations beyond the ability of untrained technicians and considerable expensive laboratory equipment is needed.

It is one object of my invention to provide a method of separating fat from fat emulsions containing suspended non-fat material, especially non-fat material of a proteinaceous nature.

It is another object of my invention to provide a fat-determination method free of prior disadvantages—i. e. not requiring the use of hazardous reagents and elaborate or costly equipment.

It is a further object of my invention to provide a method that is simple, rapid and accurate.

It is an additional object of my invention to provide a method capable of being carried out without specialized technical training, i. e. one which can readily be used by the layman.

Other objects and advantages of my invention will be apparent to those skilled in the art from the following disclosure.

In my parent application, Serial No. 64,854, I have disclosed that the emulsified fat in food products such as milk can be demulsified and collected in a layer for measurement with the aid of a high molecular weight organic surface active agent having detergent properties and comprising two surface-active materials, one belonging to the class of non-ionic and the other to the class of anionic surface-active agents. The preferred agents there disclosed are respectively a nonionic surface active agent such as polyoxyethylene sorbitan monolaurate, which is sold under the generic trade name "Tween," and an anionic surface active agent such as dioctyl sodium phosphate, which is sold under the generic trade name "Tergitol." In that application it is further disclosed that my method must be standardized for each type of product tested depending on fat content and other properties, and an example is given of suitable conditions for testing milk.

The method disclosed in my parent case which method is followed herein consists in adding the detergent composition in measured quantity to a measured quantity of the liquid dairy product, warming the mixture to allow separation of a fat layer in a measuring flask and then adding any fat immiscible liquid to displace the layer of fat into the graduated neck of the flask for purposes of measuring the volume thereof.

According to the preferred procedure of my parent application, while any detergent substance as hereinafter disclosed can effect fat separation, it was preferred not only to use two different types of detergent substances as mentioned above, but to add them to the liquid dairy product sample to be tested as a sequence. They could also be added in admixture which required ageing when an ester type of detergent such as Tween 21 was used.

In my novel method, ordinary types of apparatus can be used including Babcock flasks. However, I have provided a flask and method of using the same for stratifying a sample of liquid or mixed liquid solid or liquid gas mixture which is susceptible of separation into miscible layers. This flask as described and shown is highly useful in connection with the presently described invention, and for purposes of illustration is shown herein in the accompanying drawing in which:

Fig. 1 is a front elevational view of the flask,

Fig. 2 is a front elevational view of a measuring tube which is to be used with the flask shown in Fig. 1, and, Fig. 3 is a front elevational view of the flask and the measuring tube mounted thereon.

I have found according to my invention that an alcoholic solution of polyoxy ethylene sorbitan monolaurate, a class of nonionic substances is the preferred agent in that it can be added in the proper quantity and order to obtain the desired reaction. This substance is available under the trade name of "Tween" and for purposes of brevity may be hereinafter referred to as "Tween." The alcoholic solution may be effected by mixing 100 cc. of Tween with 60 cc. of any of the alcohols such as methyl, ethyl, propyl, isopropyl, butyl, etc., then adding an anionic compound such as dioctyl sodium phosphate of the formula $(C_8H_{17})_2NaPO_4$ which is normally a liquid, hereinafter more fully set forth. For purposes of brevity this compound which is available under the trade name of "Tergitol," may be known herein under such name.

It has been found that if the quantity of the alcoholic solution used is in less than optimum proportions, the layer of fat or fat-like substance separates as a result of the process and rising to the top as a fatty layer is greater than the fat actually present in the substance being tested. This is apparently due to the combined action of two factors, namely, the failure of the alcoholic solution to separate all of the fat-like substance and the combination of alcoholic solution with the true fat. On the other hand, if the alcoholic solution is added in greater than optimum quantities, the fat layer is less than that actually present, possibly as a result of partial saponification of the true fat. It is desirable, therefore, that the alcoholic solution be added in exact or nearly exact quantity when used with a particular type of emulsion. In this respect, it must be emphasized that the degree of emulsification existing in milk, cream, ice-cream and other fat-containing emulsions is not the same, and it is necessary that different quantities of alcoholic solution be used when testing for fat present in different sources. For example, when 8 cc. of an alcoholic solution is used to properly free the comparatively small amount of fat in milk, only 6 cc. of the same solution was found to be the optimum amount to use to free the relatively large amount of fat from ice-cream. If 8 cc. of the solution were used to free the fat, the result would be a false low reading, since the optimum quantity of alcoholic solution for the ice-cream type of emulsion is 6 cc.

It will be noted that flask 10 consists of a rounded portion 11, a flat bottom 12, a neck 13 with a ground tapered end portion 14, and a side member 15 extending upwardly from the lower portion of flask 10 by means of elbow 16 integral with arm 17.

There must next be added to the container 10 an exact quantity of a specified alcoholic solution mixture of "Tween" followed immediately and directly by a quantity, namely 8 cc., of "Tergitol" compound and then shaking to intimately mix the four ingredients. A further quantity namely 10 cc. of "Tergitol" is immediately added without stirring, through tube 17 so that this last addition of "Tergitol" will form a layer under the four-ingredient mixture in the container 10 as shown in Fig. 1. There is provided a graduated stem 25 having a flared portion 26 and an internally ground section 27 adapted to form contact with end 14 of flask 10. This stem is then connected to the flask and the container 10 with the mixture and is immediately placed in a vessel of boiling water and heated for four minutes and then removed. There is formed a plurality of layers 20 and 21. "Tergitol" is again added through stem 17 without shaking, until the graduated stem is filled, after which the container is set aside for five minutes or longer to allow all of the fat to rise in the graduated stem 25, where the amount may be read from the markings 28. In accordance with proper laboratory technique, the final reading of fat after its separation from the contents of the container is made at a temperature of 60° C.

In the step where a further quantity of "Tergitol," is carefully added without mixing to form a layer the failure to immediately add "Tergitol" or the sub-layering of "Tergitol," or both, results in a slowing down of the fat separation process, but not in inaccurate readings. It appears that "Tergitol" alone acts as a catalyst to hasten the fat-separating action of the "Tween" alcoholic solution—"Tergitol" mixture, especially when it is layered at the bottom and during heating can rise first through the specimen "Tween" alcoholic solution —"Tergitol" mixture. In the step where the container is immediately placed in a vessel of boiling water and heated for four minutes if there is any appreciable delay in placing the container in water or if the water is not boiling or near its boiling point, fat separation is slow.

For example, at present 60 cc. of 95% alcohol is mixed with 100 gms. non ionic detergent of which mixture 8 cc. is used optimally in the milk fat determination. If 100 cc. of 95% alcohol were to be added to 100 gms. of non ionic detergent and 10 cc. of this solution which is equivalent, in alcoholic solution content to the amount now used, there would not be given correct readings for milk.

In order to facilitate the reading of the fat content in the column 25 I may add a dye solution consisting of 0.2 cc. of a saturated solution of oil reddo which is a red staining fat dye similar to Sudan 3 dissolved in isopropyl alcohol. This solution is added after the specified amount of milk or other specimen has been placed in the container 10 and will impart to the fat column in the graduated stem 25 a red color and make the reading of the quantity in the graduated stem 25 much easier.

The functions of the reagents and the mechanism of my method in the case of milk products appear to be as follows: The action of the non-ionic agent is believed to be to break up and solubilize the protein-lecithin protective coating surrounding the fat globules, thus destroying their stability as dispersed elements in an oil-in-water emulsion. This, however, is not sufficient to permit rapid coalescence of the fat globules into a layer in the presence of other dispersed material, such as the dispersed non-fat material, largely proteinaceous, contained in milk. The anionic surface-active agent used in my method has the function and effect of solubilizing the latter material, thus providing a clear menstruum and permitting the fat to coalesce rapidly into a layer which can be readily measured.

In using the word "solubilizing" I do not limit myself to the formation of true molecular solutions but include the formation of solutions which appear substantially clear to the naked eye and which, if colloidal, are of such fine structure as not to interfere with coalescence of the destabilized fat globules.

My method is most accurate in the use of two surface-active agents, one a non-ionic agent effective to destabilize a fat emulsion, the other an anionic agent effective to solubilize the non-fat dispersed material in the products being tested. These agents should desirably be mutually compatible and mutually non-inhibiting, should desirably be soluble under the conditions of the test in the menstruum used, should desirably exert no substantial solubilizing action on the fat in the amount used and under the conditions of the test, and should desirably be stable.

I have found it especially advantageous in using my reagents to bring them into contact with the fat-containing emulsion being treated without substantial mechanical agitation so that the reagents and the liquid undergoing test stratify in two layers. The relative specific gravities of the two phases are preferably adjusted so as to differ by not more than 0.0075, the reagent layer usually being the heavier. On heating such a two-layer system from the bottom to hasten the physico-chemical reaction, portions of the heavier lower layer are circulated in particulate form through the upper layer and, on being there cooled, returned to the lower layer. The reverse movement takes place from the upper to the lower layer.

The advantage of this, as compared with immediate agitation and blending of the layers, is that the reagent remains in concentrated form for a considerable time, thus more effectively performing its function and forming the desired end product.

For purposes of treating dairy products a preferred range of specific gravity of my reagent layer is 1.018 to 1.068 at room temperature.

As examples of non-ionic surface-active agents effective to destabilize fat emulsions in food products, organic tissues and the like, I have found the following products suitable:

Tetradecyldesoxypolyethylene glycol ("T D 750")
Polyoxyethylene sorbitan monolaurate ("Tween 20")
Polyoxyethylene sorbitan monolaurate ("Tween 21")
Polyoxyethylene sorbitan monopalmitate ("Tween 40")
Alkylarylpolyethoxy ethanol ("Triton X–100")
Alkylphenoxypolyethoxy ethanol ("Triton X–155")
Iso-octylphenoxyethoxy ethanol ("Triton A–20")

As examples of anionic surface-active agents effective to solubilize the non-fat dispersed material in the products tested and thus to clarify the menstruum and permit rapid coalescence of the fat globules, I have found the following products suitable:

Dioctyl sodium phosphate ("Tergitol P 28")
Sodium tetradecyl sulfate ("Tergitol 4")
Triethanolamine tetradecyl sulfate ("Tergitol 4 T")
Sodium octyl sulfate ("Tergitol 08")
Diamyl sodium sulfosuccinate ("Aerosol AY")
Diisobutyl sodium sulfosuccinate ("Aerosol IB")
Sodium lauryl sulfate In addition to its use for analytical purposes, my method may be used on a large scale for separating fat from fat emulsions for the preparation of fat products. For example, the same method and reagents which are used for extracting and then measuring the fat may be used for extraction alone with the additional steps of decanting the extracted fat and washing it by passage through water to remove traces of the reagent.

It is clear that material to be treated by my method must be in fluid form. In the case of milk, cream, ice cream and the like, the materials are already fluid. Non-fluid materials such as cheese, feces, tissue, etc., may be brought into fluid form by macerating in a suitable inert menstruum which is a non-solvent for fat, such as water, physiological saline solution, dilute alcohol and the like. Coarse particles may be separated by decanting or straining before applying my method.

In applying my method I have found it desirable in many cases to use the non-ionic agent in solution in a lower alcohol such as methyl, ethyl, propyl, and butyl alcohols.

My method thus comprises broadly the separation of fat emulsified in a fluid material which contains other dispersed material by adding to the material to be tested, under conditions appropriate to the material, a non-ionic surface-active agent and an anionic surface-active agent having the properties described above, allowing the agents to act on the material, and permitting the liberated fat globules to coalesce and stratify. Both the surface-active agents are used in far higher percentages than is usual when they are used for detergent or like purposes. For example, when testing milk the non-ionic agent is preferably used in an amount in the approximate range 25–35 volume percent of the milk, and the anionic agent in the approximate range 50–250 volume percent of the milk. For other products the ranges may be respectively 1–50 volume percent for the non-ionic and 50–250 volume percent for the anionic agent.

I have further discovered that it is possible to prepare a single combined reagent, containing both the non-ionic and anionic surface-active agents, which may be effectively used in my method, and my invention also includes such combined reagent.

The chief field of application of my test method is in the analysis of milk products, i. e. whole milk, skim milk, light cream, heavy cream, ice cream and the like. In applying my method I standardize it for the particular class of milk product being tested by comparison with analyses of the same product made by an absolute method, such as the Roese-Gottlieb method. Preliminary trials in this standardization procedure determine the appropriate amount of reagent to use, appropriate time and temperature of heating, and the like. This may, for example, be accomplished by carrying out a preliminary series of tests on samples of a given product, say whole milk having an approximately 2–5% fat content, using a particular batch of reagents and varying the amount of reagents from sample to sample while keeping temperature and time of heating constant. The results are then compared with the result obtained by the Roese-Gottlieb method. That which agrees with the latter determines the test conditions applicable to the given milk product with the given batch of reagents.

Similar tests should be run for other products, e. g. heavy cream, etc. and even with the same product occasional standardization tests may be desirable to check the constancy of the reagents.

The following examples of my method are intended to be illustrative only and not to limit the scope of my invention, which is defined in the appended claims.

EXAMPLE I 17.5 ml. of milk having a fat content between 2% and 5% is measured into a Babcock flask. To this is added and mixed 8 ml. of an alcoholic solution of polyoxyethylene sorbitan monolaurate ("Tween 21") made by mixing 100 ml. of this non-ionic surface-active agent with 60 ml. of methanol. 18 ml. of dioctyl sodium phosphate ("Tergitol P-28") is then carefully added, and without mixing, to facilitate stratification. It is preferable to pour this "Tergitol P-28" down the neck of the flask, held at approximately 45° to avoid undue agitation of the contents. The flask is then set in a hot water bath at 80° C. for 4 minutes. The level of the water in the bath should be approximately one half that of the contents of the flask. Shaking of the flask is to be avoided during these operations. Thus during the heating period the reagent layer circulates by convection through the milk in relatively concentrated form. The flask is then removed from the hot water bath and enough warm water added to bring the fat layer up into the graduated neck. It is preferable to pour this water down the neck of the flask, held at approximately 45° to avoid undue agitation of the contents. The flask is then set aside for approximately 5 minutes, during which time the volume of the fat column will become constant and the volume of the fat layer is read as in the Babcock method. The addition of a small amount of fat-soluble red dye to the alcoholic solution of "Tween 21," will stain the fat and will facilitate reading of the fat layer.

It will be noted that I can achieve the same result as the above method by increasing the heating time to 5 minutes and reducing the amount of the alcoholic solution of polyoxyethylene sorbitan monolaurate to 7 ml., and the amount of dioctyl sodium phosphate to 13 ml.

Furthermore, by increasing the heating temperature upwards towards 100° C., reduced quantities of the reagents, immediately preceding, can be used. However the quantities of reagent cannot be reduced to less than half of those disclosed above without sacrificing consistency of results.

EXAMPLE II

A sample of milk was analyzed in the same way as in Example I except that the heating period at 80° C. was 5 minutes and the two surface-active agents were mixed prior to use and formed one reagent solution. As in Example I an alcohol solution is made up containing 100 ml. of "Tween 21" and 60 ml. of methanol. In this is dissolved 299 ml. of "Tergitol P-28" so that each 20 ml. of mixed solution contains substantially 13 ml. of "Tergitol P-28" and about 4 ml. of "Tween 21." This reagent solution is then allowed to stand for several days before using since a slow reaction appears to take place between "Tween" and "Tergitol." The ageing of the solution should be completed before the method of determining fat content is standardized.

20 ml. of the aged reagent solution is then added without mixing to 17.5 ml. of milk, and the mixture further treated as in Example I except that it is heated at 80° C. for five minutes.

It has been found desirable in carrying out this method to adjust the specific gravity of the reagent solution so that it is slightly heavier than that of the milk being tested, preferably 0.005±0.0025 unit heavier than the milk. This adjustment may be effected by adding a small amount of glycerine or similar inert substance such as sucrose or dextrose to increase the specific gravity of the reagent solution or by adding one of the alcohols; such as, methyl, ethyl, butyl, etc., to decrease the specific gravity of the reagent solution.

EXAMPLE III

In order to avoid the need for ageing the mixed solution of reagent found necessary in Example II, I have discovered that a non-ionic surface-active agent, which has a non-reactive linkage, such as an ether linkage instead of a reactive linkage, such as the ester linkage of "Tween 21," can be satisfactorily substituted for the latter. Such a material is the polyether alcohol sold under the trade name of "TD 750" or the polyether alcohol sold under the trade name "Triton X-100." To make up this improved reagent I melt, for example, tetradecyldesoxypolyethylene glycol by heating it over a water bath; I allow it to cool to 40° C., and then add twice its volume of dioctyl sodium phosphate. After thorough mixing I add to each liter of the mixture 50 ml. C. P. methanol and 3 ml. of a saturated solution of Oil Red O in isopropyl alcohol. This mixture is stable and accordingly may be made up in large amounts. It has been found that commercial surface-active agents of this type are not of strictly constant composition for analytical use. Accordingly, each batch so made should be standardized by trial on representative samples against the Roese-Gottlieb or other standardized methods. The mixture described is suitable for the analysis of milk having an approximate fat range of 2% to about 7%. The proportions, however, can be varied for the analysis of other types of fat-containing material. The ratio of reagents will, in general, be in the range 1:1 to 1:20 of non-ionic to anionic reagent by volume, depending upon the character of the material to be tested.

Using the reagent described above in determining fat in milk in the range 2–7%, it has been found that a deviation occurs which is linear and proportional to the amount of fat in the material being tested. It is thus possible to prepare a deviation table for any given class of milk material. Such a table may consist of parallel columns of figures, one column representing the volume reading of the fat layer in the Babcock flask and corresponding figures in the adjacent column representing the corresponding true value as determined by the Roese-Gottlieb method. A typical deviation table follows:

*Deviation table changing Schain readings to Roese-Gottlieb readings.*

| Schain, percent | R-G, percent | Schain, percent | R-G, percent | Schain, percent | R-G, percent | Schain, percent | R-G, percent |
| --- | --- | --- | --- | --- | --- | --- | --- |
| 8 | 7.3 | 5.45 | 5.15 | 4.15 | 4.08 | 2.6 | 2.77 |
| 7.9 | 7.2 | 5.4 | 5.13 | 4.1 | 4.05 | 2.5 | 2.68 |
| 7.8 | 7.1 | 5.35 | 5.1 | 4.05 | 4 | 2.4 | 2.6 |
| 7.7 | 7.03 | 5.3 | 5.05 | 4 | 3.95 | 2.3 | 2.5 |
| 7.6 | 6.95 | 5.25 | 5 | 3.95 | 3.9 | 2.2 | 2.43 |
| 7.5 | 6.85 | 5.2 | 4.95 | 3.9 | 3.88 | 2.1 | 2.35 |
| 7.4 | 6.78 | 5.15 | 4.9 | 3.85 | 3.83 | 2 | 2.28 |
| 7.3 | 6.7 | 5.1 | 4.88 | 3.8 | 3.78 | 1.9 | 2.2 |
| 7.2 | 6.6 | 5.05 | 4.83 | 3.75 | 3.75 | 1.8 | 2.1 |
| 7.1 | 6.53 | 5 | 4.78 | 3.7 | 3.7 | 1.7 | 2.03 |
| 7 | 6.45 | 4.95 | 4.75 | 3.65 | 3.65 | 1.6 | 1.95 |
| 6.9 | 6.35 | 4.9 | 4.7 | 3.6 | 3.63 | 1.5 | 1.85 |
| 6.8 | 6.28 | 4.85 | 4.65 | 3.55 | 2.58 | 1.4 | 1.78 |
| 6.7 | 6.2 | 4.8 | 4.6 | 3.5 | 3.55 | 1.3 | 1.7 |
| 6.6 | 6.1 | 4.75 | 4.58 | 3.45 | 3.5 | 1.2 | 1.6 |
| 6.5 | 6.03 | 4.7 | 4.53 | 3.4 | 3.45 | 1.1 | 1.53 |
| 6.4 | 5.95 | 4.65 | 4.50 | 3.35 | 3.4 | 1 | 1.45 |
| 6.3 | 5.85 | 4.6 | 4.45 | 3.3 | 3.35 | .9 | 1.35 |
| 6.2 | 5.8 | 4.55 | 4.4 | 3.25 | 3.33 | .8 | 1.28 |
| 6.1 | 5.7 | 4.5 | 4.38 | 3.2 | 3.28 | .7 | 1.2 |
| 6 | 5.63 | 4.45 | 4.33 | 3.15 | 3.25 | .6 | 1.13 |
| 5.9 | 5.55 | 4.4 | 4.28 | 3.1 | 3.2 | .5 | 1.05 |
| 5.8 | 5.45 | 4.35 | 4.25 | 3 | 3.1 | .4 | .95 |
| 5.7 | 5.38 | 4.3 | 4.2 | 2.9 | 3 | .3 | .85 |
| 5.6 | 5.3 | 4.25 | 4.15 | 2.8 | 2.93 | .2 | .78 |
| 5.5 | 5.2 | 4.2 | 4.13 | 2.7 | 2.85 | .1 | .7 |

It will be seen from the foregoing table that at a reading of 3.7% fat the deviation is zero. At a reading of 6.7% (3% more than 3.7%) the deviation is +0.5%, and at a reading of 0.7% (3% less than 3.7%) the deviation is —0.5%. The corrections applied are of opposite sign to the deviation.

In carrying out a test with the new reagent, 17.5 ml. of milk having a fat content of not higher than 8% is accurately measured into a Babcock flask, the flask rotated a few times and placed in a bath of boiling water for one minute. To the hot milk is then added 20 ml. of the reagent, the reagent being run down the neck of the flask which is held at an angle of approximately 45°, in order that the reagent may form a layer under the milk without substantial mixing as in Example I. The flask is then allowed to stand for about one minute, after which it is placed in boiling water for 5 minutes, the level of the boiling water being half way up the level of the liquid in the flask. After the 5 minute heating period the flask is removed from the hot water bath and distilled water at room temperature is added with a minimum of disturbance to the contents of the flask until the separated red layer is entirely within the graduated portion of the neck of the flask. The volume of the layer is then read in the usual manner. In using this method it is unnecessary to read the fat layer at 60° C., as is the usual custom with other methods, since the presence of a small amount of the surface tension depressant in the fat keeps it liquid even when the temperature falls to room temperature. The observed percentage of fat in the Babcock flask is then located in the first column of the deviation table and opposite it is read the true value.

In carrying out the invention according to my method, it will be noted that in the case of solids, such as cheese and the like, in which the fat content is to be determined or the fat extracted therefrom, such material is initially prepared by means of grinding, powdering or other suitable process, before applying my method.

While preferred methods and compositions for the extraction or determination of fat in organic substance have been described herein, it is to be understood that many modifications, as to procedure and use of materials, may be made without departing from the spirit and scope of the invention.

I claim:

1. The method of determining fat in a fluid dairy product containing emulsified fat globules and dispersed non-fat material which comprises adding to a measured amount of the product a concentrated solution of surface-active agents in a lower alcohol, said agents comprising tetradecyldesoxypolyethylene glycol and dioctyl sodium phosphate, whereby the fat globules are destabilized, heating the mixture at a temperature not substantially above the boiling point of water whereby the menstruum is clarified, permitting the fat globules to coalesce and stratify, and measuring the resulting fat layer.

2. The process defined in claim 1 in which the solution of surface-active agents is adjusted to a specific gravity 0.005± 0.0025 heavier than the dairy product by adding to the solution a soluble inert substance of substantially higher specific gravity than that of the solution.

3. The process defined in claim 1 in which the solution of surface-active agents is adjusted to a specific gravity 0.005±0.0025 heavier than the product by adding to the solution a soluble inert substance of substantially lower specific gravity than that of the solution.

4. The process defined in claim 1 in which a small amount of a fat-soluble dye is added to the solution of surface-active agents to facilitate measurement of the fat layer.

5. A composition for separating and determining fat content from a dairy product and for measuring the fat content thereof, comprising a polyoxyethylene sorbitan monolaurate and dioctyl sodium phosphate, said combination being adapted to separate fats from emulsions and the like and permit measurement thereof.

6. A combination of anionic and non-ionic surface-active agents for separating and determining fats from dairy products and the like comprising a mixture in the approximate ratio of 8 ml. of an alcoholic solution of 100 parts of polyoxyethylene sorbitan monolaurate in 60 ml. of a lower alcohol to 18 ml. of dioctyl sodium phosphate, said amounts of said combination being adapted to test the fat content in 17.5 ml. of milk.

7. A combination of anionic and non-ionic surface-active agents for separating and determining the content of fats from emulsions of dairy products and the like comprising a mixture containing substantially one part of volume of tetradecyldesoxypolyethylene glycol and two parts by volume of dioctyl sodium phosphate.

8. The process according to claim 1 in which the concentrated solution has been aged.

9. The method of separating fat from fat-containing dairy products, comprising placing a determinate quantity of the product to be tested into a flask, then adding a solution of polyoxyethylene sorbitan monolaurate and then a quantity of dioctyl sodium phosphate, warming the resultant mixture, then adding to it an excess of dioctyl sodium phosphate to the mixture until the fat in the substance separates and forms a supernatant layer letting the mixture stand until complete separation has taken place.

10. The method of separating the fat in a fat-containing dairy product, which comprises mixing an alcoholic solution of polyoxyethylene sorbitan monolaurate with the fat-containing product, then adding dioctyl sodium phosphate to the mixture without stirring, warming the mixture and finally adding sufficient dioctyl sodium phosphate to clarify the substance and form a supernatant layer of fat which is ready for reading.

11. The method of separating fat from milk and the like comprising mixing 8 cc. of an alcoholic solution of polyoxyethylene sorbitan monolaurate and then 8 cc. of dioctyl sodium phosphate with about 17.6 cc. of milk and agitating, then adding 10 cc. of dioctyl sodium phosphate without stirring, heating the resultant mixture over hot water for about four minutes, and finally adding an excess of dioctyl sodium phosphate to effect complete separation of the fat from the mixture as a supernatant layer.

12. The method according to claim 11 to which a dye is added to permit direct reading of separated fat.

13. The method of separating and determining the quantity of fat in substances such as milk and the like, comprising adding in a suitable container an alcoholic mixture of polyoxyethylene sorbitan monolaurate to the substance to be tested and then adding dioctyl sodium phosphate to mix the same then adding more dioctyl sodium phosphate and warming the resultant mixture, and finally adding an excess of dioctyl sodium phosphate and letting stand until complete separation of the fat is effected as a supernatant.

14. The method of separating and determining the quantity of fat content in a substance such as milk, comprising adding to an alcoholic mixture of polyoxyethylene sorbitan monolaurate and then dioctyl sodium phosphate to the milk, shaking, then adding more of said dioctyl sodium phosphate, warming the resultant mixture, then adding an excess of dioctyl sodium phosphate until the fat in the substance separates and forms a top layer and finally letting the mixture stand until complete separation of the fat in the mixture takes place.

15. A combination of anionic and non-ionic high molecular weight organic surface active agents having detergent properties comprising separate solutions of a polyoxyethylene sorbitan monolaurate to be added to a fat containing mixture and dioctyl sodium phosphate subsequently added thereto, said combination being adapted to separate fats from fluid dairy products and the like and permit measurements thereof, the ratio of said polyoxyethylene sorbitan monolaurate to dioctyl sodium phosphate being in the range of 1:1 to 1:20 by volume.

16. A combination of anionic and non-ionic high molecular weight organic surface active agents having detergent properties for separating fats from milk comprising a mixture in the approximate ratio of 8 cc. of an alcoholic solution of 100 parts of polyoxyethylene sorbitan monolaurate in 66 cc. of a lower alcohol to 18 cc. of dioctyl sodium phosphate, said amounts of said combination being added separately and when together being adapted to test the fat content substantially in 17.6 cc of milk.

17. The method of determining fat in a fluid dairy product containing emulsified fat globules and dispersed non-fat material which is largely proteinaceous which comprises adding to a measured amount of the product from about 25 to about 35 volume percent of polyoxyethylene sorbitan monolaurate in the form of a concentrated solution in a lower alcohol, whereby the fat globules are destabilized, and from about 50 to about 250 volume percent of dioctyl sodium phosphate, heating the mixture at a temperature not substantially above the boiling point of water, whereby the menstruum is clarified, permitting the fat globules to coalesce and stratify, and measuring the resulting fat layer.

18. The method of separating and testing the fat content of a dairy product containing dispersed non-fat material which comprises adding to the product a non-ionic surface-active material selected from the group consisting of tetradecyldesoxy-polyethylene glycol, polyoxyethylene sorbitan monolaurate, polyoxyethylene sorbitan monopalmitate, alkylarylpolyethoxy ethanol, alkylphenoxypolyethoxy ethanol, and iso-octylphenoxyethoxy ethanol, and an anionic surface-active material selected from the group consisting of dioctyl sodium phosphate, sodium tetradecyl sulfate, triethanolamine tetradecyl sulfate, sodium octyl sulfate, diamyl sodium sulfosuccinate, diisobutyl sodium sulfosuccinate, and sodium lauryl sulfate, the former having the property of destabilizing the product, the latter having the property of solubilizing the dispersed non-fat material thereby providing a clear menstruum for the fat globules, and permitting the fat globules to coalesce and stratify.

19. The method of determining fat in a dairy product containing emulsified fat globules and dispersed non-fat material which is largely proteinaceous which comprises adding to a measured amount of the emulsion a non-ionic surface-active material selected from the group consisting of tetradecyldesoxy-polyethylene glycol, polyoxyethylene sorbitan monolaurate, polyoxyethylene sorbitan monopalmitate, alkylarylpolyethoxy ethanol, alkylphenoxypolyethoxy ethanol, and iso-octylphenoxyethoxy ethanol, and an anionic surface-active material selected from the group consisting of dioctyl sodium phosphate, sodium tetradecyl sulfate, triethanolamine tetradecyl sulfate, sodium octyl sulfate, diamyl sodium sulfosuccinate, diisobutyl sodium sulfosuccinate, and sodium lauryl sulfate, the former having the property of destabilizing the emulsified fat globules, the latter having the property of solubilizing the dispersed non-fat material, thereby providing a clear menstruum for the fat globules, permitting the fat globules to coalesce and stratify, and measuring the resulting fat layer.

20. The method of separating and testing the fat content of a dairy product containing dispersed non-fat material comprising adding to the emulsion a non-ionic surface-active material selected from the group consisting of tetradecyldesoxy-polyethylene glycol, polyoxyethylene sorbitan monolaurate, polyoxyethylene sorbitan monopalmitate, alkylarylpolyethoxy ethanol, alkylphenoxypolyethoxy ethanol, and iso-octylphenoxyethoxy ethanol, and an anionic surface-active material selected from the group consisting of dioctyl sodium phosphate, sodium tetradecyl sulfate, triethanolamine tetradecyl sulfate, sodium octyl sulfate, diamyl sodium sulfosuccinate, diisobutyl sodium sulfosuccinate, and sodium lauryl sulfate, the former having the property of destabilizing the fat emulsion, the latter having the property of solubilizing the dispersed non-fat material, heating the resultant mixture to a temperature not exceeding that of boiling water, and permitting the fat to stratify.

References Cited in the file of this patent

UNITED STATES PATENTS

| | | |
|---|---|---|
| 1,853,414 | Gunther et al. | Apr. 12, 1932 |
| 2,133,735 | Waterman et al. | Oct. 18, 1938 |
| 2,360,135 | Hull | Oct. 10, 1944 |
| 2,380,166 | Griffin | July 10, 1945 |
| 2,391,041 | Stamberger | Dec. 18, 1945 |
| 2,525,702 | Mattikow | Oct. 10, 1950 |
| 2,544,725 | Rider | Mar. 13, 1951 |
| 2,560,626 | Boissonow | July 17, 1951 |

OTHER REFERENCES

"Spans and Tweens," Hercules Powder Co., Wilmington, Del., 1945, pages 2 and 3.